United States Patent
Kim et al.

(10) Patent No.: US 12,444,021 B2
(45) Date of Patent: Oct. 14, 2025

(54) ELECTRONIC DEVICE AND CONTROL METHOD THEREOF

(71) Applicant: SAMSUNG ELECTRONICS CO., LTD., Suwon-si (KR)

(72) Inventors: Taehwan Kim, Suwon-si (KR); Seokjae Lee, Suwon-si (KR); Byungkwon Kang, Suwon-si (KR); Jinwoo Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 18/188,868

(22) Filed: Mar. 23, 2023

(65) Prior Publication Data

US 2023/0237631 A1   Jul. 27, 2023

Related U.S. Application Data

(63) Continuation of application No. PCT/KR2021/009819, filed on Jul. 28, 2021.

(30) Foreign Application Priority Data

Sep. 23, 2020 (KR) .................. 10-2020-0122785

(51) Int. Cl.
  *G06T 5/50* (2006.01)
  *G06T 1/20* (2006.01)
(52) U.S. Cl.
  CPC .............. *G06T 5/50* (2013.01); *G06T 1/20* (2013.01); *G06T 2207/20221* (2013.01)
(58) Field of Classification Search
  None
  See application file for complete search history.

(56) References Cited

U.S. PATENT DOCUMENTS

| 6,909,438 | B1  | 6/2005 | White et al. |
| 2006/0061687 | A1* | 3/2006 | Dunton .............. H04N 21/4355 348/556 |

(Continued)

FOREIGN PATENT DOCUMENTS

| JP | 2015-109592 | 6/2015 |
| KR | 10-2006-0028852 | 4/2006 |

(Continued)

OTHER PUBLICATIONS

International Search Report for PCT/KR2021/009819 mailed Nov. 24, 2021, 4 pages.

(Continued)

*Primary Examiner* — James A Thompson
*Assistant Examiner* — Kim Thanh T Tran
(74) *Attorney, Agent, or Firm* — NIXON & VANDERHYE P.C.

(57) ABSTRACT

An electronic apparatus may include: a video processor configured to output a video frame; a graphic processor configured to output a graphic frame; a mixer; and a processor which may be configured to: control the mixer to generate and output a first composite frame based on the video frame and the graphic frame, generate a second composite frame, which comprises a video area corresponding to the video frame and a graphic area corresponding to the graphic frame in a displayed image, and in which the video area and the graphic area have undergone image effect processing, based on an event of the image effect processing, and control the mixer to output the second composite frame.

16 Claims, 12 Drawing Sheets

(56) References Cited

U.S. PATENT DOCUMENTS

| | | | |
|---|---|---|---|
| 2006/0066633 A1 | 3/2006 | Jeong | |
| 2006/0288372 A1* | 12/2006 | Harada | G06F 3/0482 |
| | | | 725/52 |
| 2011/0085024 A1 | 4/2011 | Ota | |
| 2012/0120320 A1* | 5/2012 | Chowdhry | H04N 9/75 |
| | | | 345/547 |
| 2012/0188459 A1 | 7/2012 | Madonna et al. | |
| 2013/0050254 A1* | 2/2013 | Tran | H04N 19/103 |
| | | | 345/629 |
| 2017/0201710 A1* | 7/2017 | Kim | H04N 1/6072 |
| 2018/0052652 A1 | 2/2018 | Kim et al. | |
| 2018/0075660 A1 | 3/2018 | Jouet et al. | |
| 2019/0122339 A1 | 4/2019 | Moon et al. | |

FOREIGN PATENT DOCUMENTS

| | | |
|---|---|---|
| KR | 10-2007-0090473 | 9/2007 |
| KR | 10-0869309 | 11/2008 |
| KR | 10-2012-0073253 | 7/2012 |
| KR | 10-2013-0025178 | 3/2013 |
| KR | 10-1265609 | 5/2013 |
| KR | 10-2017-0112066 | 10/2017 |
| KR | 10-2018-0021352 A | 3/2018 |
| KR | 10-2018-0030446 | 3/2018 |

OTHER PUBLICATIONS

Written Opinion of the ISA for PCT/KR2021/009819 mailed Nov. 24, 2021, 5 pages.

Korean Office Action dated Aug. 2, 2025 issued in Korean Patent Application No. 10-2020-0122785 and English translation, 6 pp.

* cited by examiner

ELECTRONIC DEVICE AND CONTROL METHOD THEREOF

CROSS-REFERENCE TO RELATED APPLICATIONS

This application is a continuation of International Application No. PCT/KR2021/009819 designating the United States, filed on Jul. 28, 2021, in the Korean Intellectual Property Receiving Office and claiming priority to Korean Patent Application No. 10-2020-0122785 filed on Sep. 23, 2020, in the Korean Intellectual Property Office, the disclosures of which are incorporated by reference herein in their entireties.

BACKGROUND

Field

Certain example embodiments relate to an electronic apparatus and/or a method of controlling the same, and for example to an electronic apparatus and/or a method of controlling the same, in which a composite frame is output based on a video frame and a graphic frame.

Description of Related Art

An electronic apparatus may generate and display a composite frame by combining a graphic frame with a video frame. For example, the electronic apparatus displays an electric program guide (EPG) for selecting a broadcast program channel number corresponding to the graphic frame, and generates the composite frame by combining the EPG with a broadcast program of a selected channel corresponding to the video frame, thereby displaying the broadcast program of the selected channel together with the EPG.

The electronic apparatus may perform image effect processing for the graphic frame when receiving an event of the image effect processing for the graphic frame. For example, the electronic apparatus may perform blurring for the EPG and output the blurred EPG when receiving an event of requiring the blurring to be performed with respect to the EPG for selecting the broadcast program channel number.

However, in an apparatus configured to perform the image effect processing for the graphic frame before combining with the video frame, only the image effect processing for the graphic frame is performed, and therefore the image effect processing is not performed with respect to the video frame.

The composite frame, in which the image effect processing has been performed differently between the video frame and the graphic frame, may cause a user to feel visually instable, and such visual instability leads to overall poor image quality.

SUMMARY

Therefore, the apparatus configured to perform the image effect processing for the graphic frame before combining with the video frame is desired to improve the image quality of the composite frame, to which the image effect processing has been applied, by outputting the composite frame based on the video frame and the graphic frame, which have equally undergone the image effect processing, in response to an event of requiring the image effect processing for the composite frame.

Certain example embodiments may provide an electronic apparatus configured to perform image effect processing for a graphic frame before combining with a video frame and improved in image quality of a composite frame, to which the image effect processing has been applied, by outputting the composite frame based on the video frame and the graphic frame, which have equally undergone the image effect processing, in response to an event of requiring the image effect processing for the composite frame, and a method of controlling the same.

According to an example embodiment, an electronic apparatus may comprise: a video processor configured to output a video frame; a graphic processor configured to output a graphic frame; a mixer; and a processor configured to: control the mixer to generate and output a first composite frame based on the video frame and the graphic frame, generate a second composite frame, which comprises a video area corresponding to the video frame and a graphic area corresponding to the graphic frame in a displayed image, and in which the video area and the graphic area have undergone image effect processing, based on an event of the image effect processing, and control the mixer to output the second composite frame.

The processor may store at least one of the graphic frame or the first composite frame in a buffer memory, combines the stored graphic frame or first composite frame with a subsequent video frame, and perform the image effect processing to generate the second composite frame.

The processor may control the second composite frame to be output based on an event of simultaneously displaying video content corresponding to the video frame and a menu item corresponding to the graphic frame.

The processor may control the first composite frame to be output based on an event of terminating the display of the menu item.

The processor may control the second composite frame to be output based on an event of displaying a second menu item corresponding to a graphic frame different from the graphic frame on the video area and the graphic area in which the video content and the menu item are simultaneously displayed respectively.

The processor may control the stored graphic frame or first composite frame to be updated with a new graphic frame based on an event of updating the graphic frame.

According to an example embodiment, a method of controlling an electronic apparatus may be provide where the method may comprise: generating and outputting a first composite frame based on a video frame and a graphic frame; generating a second composite frame, which comprises a video area corresponding to the video frame and a graphic area corresponding to the graphic frame in a displayed image, and in which the video area and the graphic area have undergone image effect processing, based on an event of the image effect processing; and outputting the second composite frame.

The generating and outputting the first composite frame may comprise storing at least one of the graphic frame or the first composite frame, and the generating the second composite frame may comprise combining the stored graphic frame or first composite frame with a subsequent video frame, and performing the image effect processing to generate the second composite frame.

The outputting the second composite frame may comprise outputting the second composite frame based on an event of simultaneously displaying video content corresponding to the video frame and a menu item corresponding to the graphic frame.

The method may comprise outputting the first composite frame based on an event of terminating the display of the menu item.

The method may comprise outputting the second composite frame based on an event of displaying a second menu item corresponding to a graphic frame different from the graphic frame on the video area and the graphic area in which the video content and the menu item are simultaneously displayed respectively.

The method may comprise updating the stored graphic frame or first composite frame with a new graphic frame based on an event of updating the graphic frame.

According to an example embodiment, a recording medium stored with a computer program may comprise a code to perform a method of controlling an electronic apparatus as a computer-readable code, where the method may comprise: generating and outputting a first composite frame based on a video frame and a graphic frame; generating a second composite frame, which may comprise a video area corresponding to the video frame and a graphic area corresponding to the graphic frame in a displayed image, and in which the video area and the graphic area have undergone image effect processing, based on an event of the image effect processing; and outputting the second composite frame.

According to an example embodiment, there may be provided an electronic apparatus configured to perform image effect processing for a graphic frame before combining with a video frame and output a composite frame based on the video frame and the graphic frame, which have equally undergone the image effect processing, in response to an event of requiring the image effect processing for the composite frame, and a method of controlling the same.

BRIEF DESCRIPTION OF DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
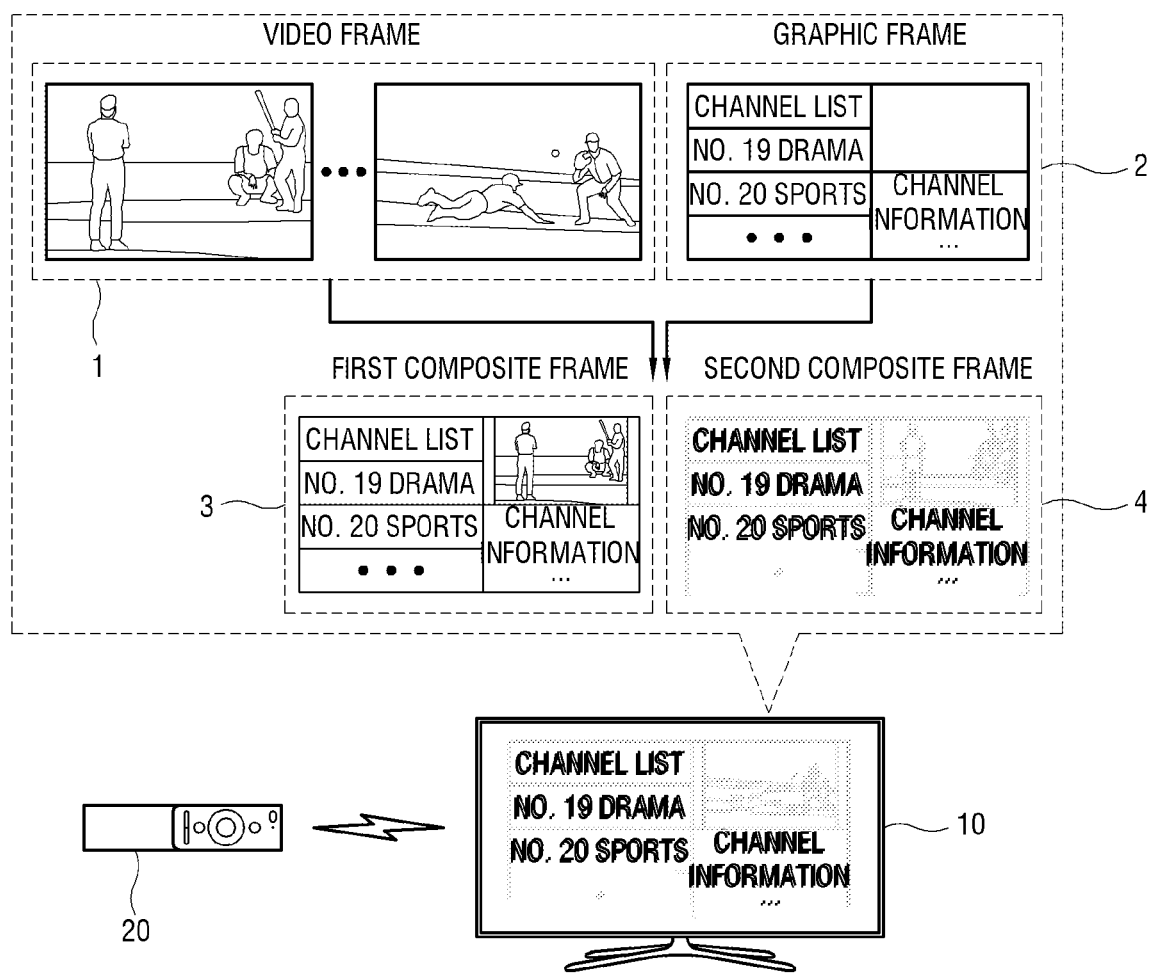
FIG. 1 illustrates an electronic apparatus according to an example embodiment.

Below, certain example embodiments will be described in detail with reference to the accompanying drawings.

In this specification, a reference numeral in the accompanying drawing may be used to refer to the same element even in the other accompanying drawings. Features, e.g., detailed structures and configurations, defined in the following descriptions, are to help the understanding of an embodiment. However, the embodiments described in this specification may be carried out without any specifically defined features. Further, details of well-known functions or structure will not be described.

In this specification, expressions such as "A or B", "at least one of A or/and B" or "one or more of A or/and B" may include all possible combinations of elements listed together. For example, "A or B", "at least one of A and B" or "at least one of A or B" may refer to all the cases of including at least one A, including at least one B, or including both at least one A and at least one B.

In this specification, expressions such as "first", "second", "the first", and "the second" may modify various elements regardless of order and/or importance, and do not limit the elements. Such expressions may be used to distinguish one element from another element.

In the description of the following embodiments, elements illustrated in the accompanying drawings will be referenced, and like numerals or symbols set forth in the drawings refer to like elements having substantially the same operations.

FIG. 1 illustrates an electronic apparatus according to an example embodiment.

As shown in FIG. 1, an electronic apparatus 10 may be implemented by various types of apparatuses, such as a set-top box having no display, and the like image processing apparatuses; a refrigerator, a washing machine, and the like home appliances; a computer and the like information processing apparatuses; as well as a TV, a tablet PC, a portable media player, a wearable device, a video wall, an electronic picture frame, and the like image display apparatuses. Further, the electronic apparatus 10 may be implemented by an artificial intelligence (AI) loudspeaker with an AI function, an AI robot, etc. However, for convenience of description, it will be assumed that the TV is implemented as the electronic apparatus 10, but there are no limits to the type of the electronic apparatus 10.

The electronic apparatus 10 displays a video frame 1 and/or a graphic frame 2. The video frame 1 refers to a dynamic frame that forms an image on which an object continuously moves over time, and includes a plurality of video frames 1. On the other hand, the graphic frame 2 refers to a static frame.

The electronic apparatus 10 may display video content, e.g., a sport program, corresponding to the video frame 1, or an electric program guide (EPG) corresponding to the graphic frame 2. The EPG refers to guide information related to a broadcast program, and may include information about the title, channel number, broadcasting time, detailed description, recording, other content, etc. of the broadcast program.

The electronic apparatus 10 may combine the graphic frame 2 with the video frame 1, and generate and output a first composite frame 3 based on combination between the video frame 1 and the graphic frame 2. For example, when the graphic frame 2 corresponds to the EPG for selecting the broadcast program channel number, and a "No. 20 sport" channel is selected through the EPG for selecting the broadcast program channel number, the electronic apparatus 10 combines a broadcast program of the "No. 20 sport" channel corresponding to the video frame 1 with the EPG for selecting the broadcast program channel number, thereby generating and outputting the first composite frame 3. When a "No. 19 drama" channel is selected, a drama program of the "No. 19 drama" channel corresponding to the video frame 1 is combined to the EPG corresponding to the graphic frame 2, thereby generating the first composite frame 3. The processes of generating and outputting the first composite frame 3 will be described in detail with reference to FIG. 5.

The electronic apparatus 10 may generate and output a second composite frame 4. The second composite frame 4 includes the video frame 1 and the graphic frame 2 which have equally undergone the image effect processing. For example, when the image effect processing is blurring, the electronic apparatus 10 may generate and output the second composite frame 4 by applying the blurring to both the broadcast program of the "No. 20 sport" channel and the EPG for selecting the broadcast program channel number.

In particular, even though the image effect processing for the graphic frame 2 is structured to be performed before combining with the video frame 1 as described above, the electronic apparatus 10 may generate and output the second composite frame 4 based on the video frame 1 and the graphic frame 2 which have equally undergone the image effect processing. The processes of generating and outputting the second composite frame 4 will be described in detail with reference to FIG. 7.

Meanwhile, an imaging effect is not limited to the blurring, but may include sharpening, filtering, etc. However, for the convenience of description, it will be described on the assumption that the image effect processing is the blurring.

The second composite frame 4 may be generated and output in response to an event of the image effect processing. The event of the image effect processing may be received through a user input 13 (e.g., see FIG. 2) internally provided in a main body or a remote controller 20 separated from the main body.

The event may be based on a user's input made by the user, and the user's input may be based on speech recognition processing performed by a speech command. When the remote controller 20 is used, a speech signal corresponding to the speech command is received from the remote controller 20 and the received speech signal undergoes the speech recognition processing.

The speech recognition processing includes a speech-to-text (STT) process for converting a speech command into text data, and a command identification and execution process for identifying a command based on the text data and carrying out an operation based on the identified command. Although the electronic apparatus 10 can perform the whole speech recognition processing, at least a part of the processing may be performed in at least one server connected, directly or indirectly, for communication with the electronic apparatus 10 through a network when a system load and a required storage capacity are taken into account. For example, at least one server performs the STT process, and the electronic apparatus 10 performs the command identification and execution process. Alternatively, at least one server may perform both the STT process and the command identification and execution process, and the electronic apparatus 10 may just receive a result from the at least one server.

In this way, the electronic apparatus 10 configured to apply the image effect processing to the graphic frame 2 before combining with the video frame 1 may generate and output the second composite frame 4 based on the video frame 1 and the graphic frame 2 which have equally undergone the image effect processing, in response to the event of the image effect processing.

If only the graphic frame 2 undergoes the image effect processing in response to the event of the image effect processing, the composite frame, of which the video frame and the graphic frame have differently undergone the image effect processing, may cause a user to feel visually instable, and such visual instability leads to overall poor image quality.

In this regard, the electronic apparatus 10 generates the second composite frame 4 based on the video frame 1 and the graphic frame 2 which have equally undergone the image effect processing, thereby not only causing a user to feel visually stable but also providing an image improved in quality.

Figure 2:
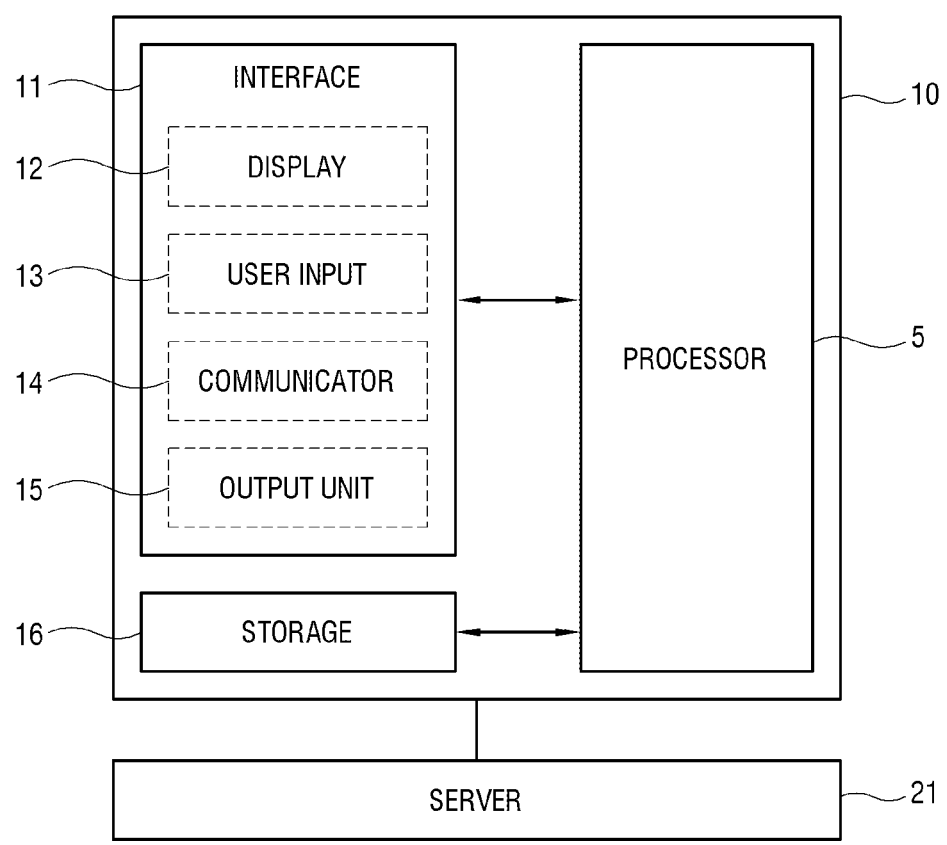
FIG. 2 illustrates an example of a configuration of the electronic apparatus in FIG. 1.

FIG. 2 illustrates a configuration of the electronic apparatus of FIG. 1.

Below, an example of the configuration of the electronic apparatus 10 will be described with reference to FIG. 2. In this embodiment, it will be described that the electronic apparatus 10 is a TV. However, the electronic apparatus 10 may be implemented by various kinds of apparatuses, and this embodiment does not limit the configuration of the electronic apparatus 10. The electronic apparatus 10 may not be implemented by the TV or the like display apparatus, and the electronic apparatus 10 in this case may not include a display 12 and the like elements for displaying an image. For example, when the electronic apparatus 10 is implemented by the set-top box, the electronic apparatus 10 outputs an image signal to an external TV through an interface 11.

The electronic apparatus 10 includes the interface 11. The interface 11 is connected, directly or indirectly, to a server 21, another external apparatus, and the like. and transmits and receives data to and from the server 21, another external apparatus, and the like. However, the interface 11 may be connected to various apparatuses through a network, without limitations.

The interface 11 includes a wired interface. The wired interface includes a connector or port to which an antenna for receiving a broadcast signal based on terrestrial/satellite broadcasting standards and the like broadcasting standards is connected, or to which a cable for receiving a broadcast signal based on cable broadcasting standards is connected. Alternatively, the electronic apparatus 10 may include a built-in antenna for receiving a broadcast signal. The wired interface includes a connector, a port, etc. based on video and/or audio transmission standards, such as an HDMI port, DisplayPort, a DVI port, a thunderbolt, composite video, component video, super video, syndicat des constructeurs des appareils radiorécepteurs et téléviseurs (SCART). The wired interface includes a connector, a port, etc. based on universal data transmission standards, such as a universal serial bus (USB) port, etc. The wired interface includes a connector, a port, etc. to which an optical cable based on optical transmission standards is connectable.

The wired interface may include a connector, a port, etc. to which an internal audio receiver and an external audio device with an audio receiver are connected, directly or indirectly, and which receives or inputs an audio signal from the audio device. The wired interface includes a connector, a port, etc. to which a headset, an earphone, an external loudspeaker or the like audio device is connected, and which transmits or outputs an audio signal to the audio device. The wired interface includes a connector or a port based on Ethernet or the like network transmission standards. For example, the wired interface may be implemented by a local area network (LAN) card or the like connected to a router or a gateway by a wire.

The wired interface is connected, directly or indirectly, to a set-top box, an optical media player or the like external apparatus or an external display apparatus, a loudspeaker, a server, etc. by a cable in a manner of one-to-one or one-to-N (where, N is a natural number) through the connector or the port, thereby receiving a video/audio signal from the corresponding external apparatus or transmitting a video/audio signal to the corresponding external apparatus. The wired interface may include connectors or ports to individually transmit video/audio signals.

The wired interface may be built-in the electronic apparatus 10, but may also be implemented in the form of a dongle or a module and detachably connected to the connector of the electronic apparatus 10.

The interface 11 includes a wireless interface. The wireless interface may be variously implemented corresponding to the type of the electronic apparatus 10. For example, the wireless interface uses wireless communication based on radio frequency (RF), Zigbee, Bluetooth, Wi-Fi, ultra wideband (UWB), near field communication (NFC) etc. The wireless interface may be implemented by a wireless communication module (comprising communication circuitry) that performs wireless communication with an access point (AP) based on Wi-Fi, a wireless communication module that performs one-to-one direct wireless communication such as Bluetooth, etc.

The wireless interface wirelessly communicates with a server on the network to thereby transmit and receive a data packet to and from the server. The wireless interface includes an infrared (IR) transmitter and/or an IR receiver to transmit and/or receive an IR signal based on IR communication standards.

The wireless interface receives or inputs a remote-control signal from a remote controller 20 or other external devices, or transmits or outputs the remote-control signal to the remote controller 20 or other external devices through the IR transmitter and/or IR receiver. Alternatively, the electronic apparatus 10 may transmit and receive the remote-control signal to and from the remote controller 20 or other external devices through the wireless interface based on Wi-Fi, Bluetooth or the like other standards.

The electronic apparatus 10 may further include a tuner to be tuned to channels for a broadcast signal, when the broadcast signal is a video/audio signal received through the interface 11.

The electronic apparatus 10 includes the display 12. The display 12 includes a display panel capable of displaying an image on a screen thereof. The display panel may have a light receiving structure like a liquid crystal display (LCD) type, or a self-emissive structure like an organic light emitting diode (OLED) type. The display 12 may include an additional element according to the structures of the display panel. For example, when the display panel is of the LCD type, the display 12 includes an LCD panel, a backlight unit for illuminating the LCD panel, and a panel driving substrate for driving liquid crystal of the LCD panel. However, as described above, the display 12 may be excluded when the electronic apparatus 10 is implemented by a set-top box or the like.

The electronic apparatus 10 includes the user input 13. The user input 13 includes various types of input interface-related circuits provided to be controlled by a user and allowing the user to make an input. The user input 13 may be configured in various forms according to the types of the electronic apparatus 10, and may for example include mechanical or electronic buttons of the electronic apparatus 10, a touch pad, a touch screen installed on the display 12, etc.

The electronic apparatus 10 includes a communicator 14. The communicator 14, comprising communication circuitry, is connected, directly or indirectly, to the server, other external apparatus, and the like and transmits a video/audio signal to the server, other external apparatus, and the like. The communicator 14 may be designed to include at least one of the wired interface or the wireless interface, and performs the function of at least one of the wired interface or the wireless interface.

The electronic apparatus 10 includes an output unit 15 comprising output circuitry. The output unit 15 outputs various audios based on audio signals. The output unit 15 is implemented by at least one loudspeaker. The output unit 15 may be implemented by an internal loudspeaker provided in the electronic apparatus 10 or an external loudspeaker provided in the outside. When the output unit 15 is implemented by the external loudspeaker, the electronic apparatus 10 transmits an audio signal to the external loudspeaker through a cable or wirelessly.

The electronic apparatus 10 includes an audio receiver. The audio receiver receives various audio signals. The audio receiver receives not only a signal of a user's speech but also a signal of sounds, such as noise, collected from the surroundings. The audio receiver transmits a collected audio signal to a processor 5. The audio receiver may be implemented by an internal microphone provided in the electronic apparatus 10 or an external microphone provided in the remote controller 20 separated from the main body. When the audio receiver is implemented by the external microphone, the audio signal received in the external microphone is digitized and then transmitted from the remote controller 20 to the interface 11.

The remote controller 20 may include a smartphone, and the like, and the smartphone may be installed with a remote control application. The smartphone or the like may function as the remote controller 20 through the installed application, for example, to control the electronic apparatus 10. Such a remote control application may be installed in various external apparatuses such as artificial intelligence (AI) loudspeaker, and an AI robot.

The electronic apparatus 10 includes a sensor. The sensor performs detecting in front of the electronic apparatus 10, and detects the presence, motion, etc. of the user or other electronic apparatuses. For example, the sensor may be implemented by an image sensor, performs capturing in a frontward direction of the electronic apparatus 10, and obtain information about the presence, motion, etc. of the user or other electronic apparatuses from the captured image. The image sensor is implemented by a camera using a complementary metal oxide semiconductor (CMOS) or a charge coupled device (CCD). The sensor may be implemented by an infrared sensor, measure time taken by an infrared signal output frontward to return back, and obtain information about the presence, motion, etc. of the user or other electronic apparatuses.

The display 12, the user input 13 which may comprise input circuitry, the communicator 14 which may comprise circuitry, the output unit 15 which may comprise output circuitry, the audio receiver, the sensor, etc. are described as elements that are separate from the interface 11, but may be designed to be included in the interface 11.

The electronic apparatus 10 includes a storage 16. The storage 16 is configured to store digitized data. The first storage 16 includes a nonvolatile storage in which data is retained regardless of whether power is on or off. The storage includes a flash memory, a hard-disc drive (HDD), a solid-state drive (SSD), a read only memory (ROM), etc.

The second storage 16 is loaded with data or the like to be processed by the processor 5, and includes a volatile memory in which data is retained only when power is on. The memory includes a buffer memory 35, a random-access memory (RAM), etc.

The electronic apparatus 10 includes the processor 5. The processor 5 includes one or more hardware processors implemented as a central processing unit (CPU), a chipset, a buffer, a circuit, etc. which are mounted onto a printed circuit board (PCB), and may be designed as a system on chip (SoC).

When the electronic apparatus 10 is implemented as a display apparatus, the processor 5 includes modules corresponding to various processes, such as a demultiplexer, a decoder, a scaler, an audio digital signal processor (DSP), an amplifier, etc. Here, some or all of such modules may be implemented as an SOC. For example, the demultiplexer, the decoder, the scaler and the like video processing modules may be implemented as a video processing SOC, and the audio DSP may be implemented as a chipset separated from the SOC.

However, the configuration of the electronic apparatus 10 is not limited to that shown in FIG. 2, but may be designed to exclude some elements from the foregoing configuration or include other elements in addition to the foregoing configuration.

Figure 3:
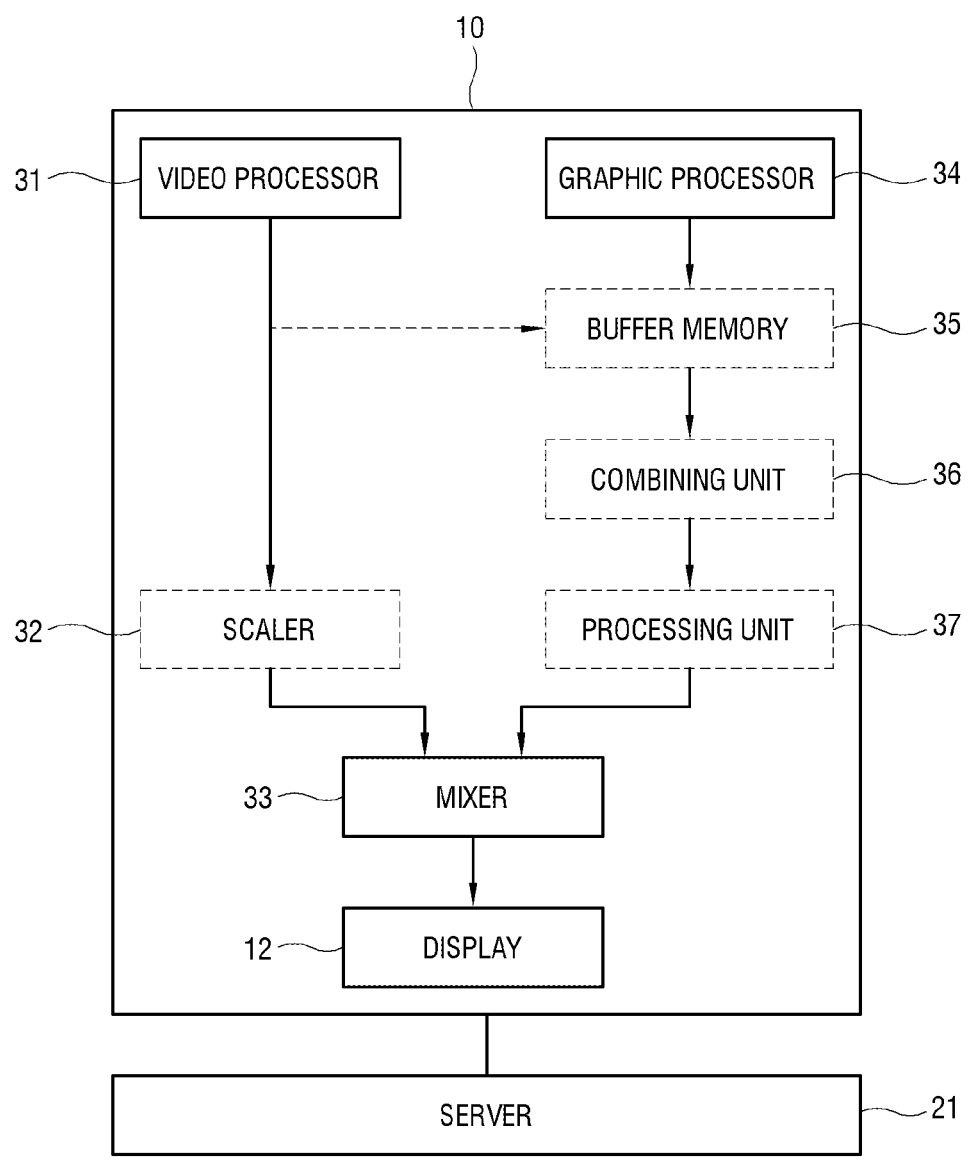
FIG. 3 illustrates a detailed example of the configuration of the electronic apparatus in FIG. 2.

FIG. 3 illustrates a detailed example of the configuration of the electronic apparatus in FIG. 2.

Below, the detailed example of the configuration of the electronic apparatus 10 will be described with reference to FIG. 3. In this embodiment, the electronic apparatus 10 is a TV, but the electronic apparatus 10 may be implemented by various types of apparatuses. Therefore, this embodiment does not limit the configuration of the electronic apparatus 10.

The electronic apparatus 10 includes a video processor 31. The video processor 31 outputs the video frame 1. The video frame 1 includes a dynamic frame that forms an image on which an object continuously moves over time.

The electronic apparatus 10 includes a graphic processor 34. The graphic processor 34 outputs the graphic frame 2. The graphic frame 2 includes a static frame of which an object does not move over time.

The electronic apparatus 10 includes a scaler 32. The scaler 32 adjusts the size, position, etc. of the video frame 1. For example, the scaler 32 may decrease the size of the video frame 1 to fit in a certain area of the graphic frame 2 in order to generate the first composite frame 3. The scaler 32 may decrease the size of the video frame 1 to fit in a video area 6 (see FIG. 5) corresponding to the video frame 1 included in the first composite frame 3. The video area 6 includes a certain area of the graphic frame 2. However, without limitations, the scaler 32 may adjust the video frame 1 to have a higher resolution.

The electronic apparatus 10 includes a mixer 33. The mixer 33 combines the graphic frame 2 with the video frame 1 to generate the first composite frame 3. The video frame 1 combined to the graphic frame 2 by the mixer 33 may have been adjusted in size, position, etc. by the scaler 32. The first composite frame 3 generated through the mixer 33 may be output to and displayed on the display 12.

Meanwhile, the mixer 33 receives the second composite frame 4, which has undergone the image effect processing by a processing unit 37 comprising processing circuitry (to be described later), in response to activation of the processing unit 37. The mixer 33 may transmit the second composite frame 4 received in response to the activation of the processing unit 37 to the display 12. The process where the mixer 33 transmits the second composite frame 4 will be described in detail in connection with the processing unit 37 to be described below.

The electronic apparatus 10 includes a buffer memory 35. The buffer memory 35 is configured to store the graphic frame 2 or the first composite frame 3. The graphic frame 2 or the first composite frame 3 may have not undergone the image effect processing. The buffer memory 35 may be configured to store the graphic frame 2 or the first composite frame 3 in response to the activation of the processing unit 37 (to be described below). The buffer memory 35 may be configured to store the video frame 1 output from the video processor 31, in response to the activation of the processing unit 37. The data stored in the buffer memory 35 will be described in detail with reference to FIG. 8 for example.

The electronic apparatus 10 includes a combining unit 36 comprising circuitry. The combining unit 36 combines the video frame 1 with the graphic frame 2 or the first composite frame 3 stored in the buffer memory 35, in response to the activation of the processing unit 37 comprising processing circuitry. The combining unit 36 may perform scaling or the like for the video frame 1 in order to combine the video frame 1 with the graphic frame 2 or the first composite frame 3. However, the scaling or the like for the video frame 1 may be performed by the buffer memory 35, or may be performed by another element included in the buffer memory 35. For example, the combining unit 36 may decrease the size of the video frame 1 to fit in the video area 6 (see FIG. 7) corresponding to the video frame 1. The video area 6 includes a certain area of the graphic frame 2 or the first composite frame 3.

The electronic apparatus 10 includes the processing unit 37. The processing unit 37 is activated in response to the event of requiring the image effect processing. The event of requiring the image effect processing may be based on a user's input received through the user input 13. The user's input may be based on the speech recognition processing performed by the speech command of the user.

The processing unit 37 generates the second composite frame 4 by applying the image effect processing to a composite frame made by the combining unit 36. As described above, the composite frame made by the combining unit 36 includes a composite frame between the video frame 1 and the graphic frame 2, or a composite frame between the video frame 1 and the first composite frame 3. The image effect processing may include blurring, sharpening, filtering, etc.

The processing unit 37 may apply additional image processing to the second composite frame 4 that has undergone the image effect processing. The additional image processing may include various types of image processing to display the second composite frame 4, which has undergone the image effect processing, on the display 12. The processing unit 37 may include a graphic processing unit (GPU) for the additional image processing.

Meanwhile, the processing unit 37 may include an element for performing the foregoing image effect processing and an element for performing the additional image processing. For example, the processing unit 37 may include an effect applying unit to generate the second composite frame 4 by applying the image effect processing to the composite frame made by the combining unit 36. The processing unit 37 may include an effect processing unit to apply the additional image processing to the second composite frame 4 that has undergone the image effect processing. However, it is optional based on design whether the image effect processing or the like is performed by one element or two elements, and it will be described for the convenience of description that the processing unit 37 is used to perform the image effect processing or the like.

The mixer 33 receives the second composite frame 4, which has undergone the image effect processing, from the processing unit 37 in response to the activation of the processing unit 37. The second composite frame 4 may have undergone the additional image processing in addition to the image effect processing. The mixer 33 may perform a bypassing function which outputs the second composite frame 4 to the display 12.

MI On the other hand, the mixer 33 generates the first composite frame 3 by combining the graphic frame 2 with the video frame 1, which is adjusted in size, position, etc. through the scaler 32, in response to inactivation of the processing unit 37. In other words, the mixer 33 may perform functions different according to whether the processing unit 37 is activated or inactivated, because the bypassing function is performed for the second composite frame 4 received from the processing unit 37 in response to the activation or the inactivation of the processing unit 37.

The configuration of the electronic apparatus 10 is not limited to that shown in FIG. 3, and may be designed to exclude some elements from the foregoing configuration or include other elements in addition to the foregoing configuration. Further, some of the configuration shown in FIG. 3 may be included in the processor 5 of FIG. 2, or some operations of the configuration shown in FIG. 3 may be performed by the processor 5. For example, the combining unit 36, the processing unit 37, etc. may be implemented as software by the processor 5.

The processor 5 may control the mixer 33 to generate and output the first composite frame 3 based on the video frame 1 and the graphic frame 2 when the video processor 31 outputs the video frame 1 and the graphic processor 34 outputs the graphic frame 2. Foregoing operations may be performed in response to the inactivation of the processing unit 37.

The processor 5 generates the second composite frame 4, which includes the video area 6 corresponding to the video frame 1 and a graphic area 7 corresponding to the graphic frame 2 in a displayed image, and, in which the video area 6 and the graphic area 7 have undergone the image effect processing, in response to the event of the image effect processing, and may control the second composite frame 4 to be output through the mixer 33. Foregoing operations may be performed in response to the activation of the processing unit 37.

The processor 5 of the electronic apparatus 10 may apply AI technology using a rule-based or AI algorithm to at least one of data analysis, processing, and result-information generation for the foregoing operations, thereby constructing an AI system.

The AI system refers to a computer system that has an intelligence level of a human, in which a machine learns and determines by itself, and gets higher recognition rates the more it is used. The AI algorithm refers to an algorithm that classifies/learns features of input data by itself.

The AI technology is based on elementary technology by using at least one of machine learning, neural network, or deep learning algorithm to copy perception, determination and the like functions of a human brain.

The elementary technology may include at least one of linguistic comprehension technology for recognizing a language/text of a human, visual understanding technology for recognizing an object like a human sense of vision, inference/prediction technology for identifying information and logically making inference and prediction, knowledge representation technology for processing experience information of a human into knowledge data, and motion control technology for controlling a vehicle's automatic driving or a robot's motion.

The linguistic comprehension refers to technology of recognizing and applying/processing a human's language/character, and includes natural language processing, machine translation, conversation system, question and answer, speech recognition/synthesis, etc. The visual understanding refers to technology of recognizing and processing an object like a human sense of vision, and includes object recognition, object tracking, image search, people recognition, scene understanding, place understanding, image enhancement, etc. The inference/prediction refers to technology of identifying information and logically making prediction, and includes knowledge/possibility-based inference, optimized prediction, preference-based plan, recommendation, etc. The knowledge representation refers to technology of automating a human's experience information into knowledge data, and includes knowledge building (data generation/classification), knowledge management (data utilization), etc.

Below, it will be described by way of example that the AI technology using the foregoing AI algorithm is achieved by the processor 5 of the electronic apparatus 10. However, the same AI technology may also be achieved by the server processor of the server.

The processor 5 functions as both a learner and a recognizer. The learner performs a function of generating the trained neural network, and the recognizer performs a function of recognizing (inferring, predicting, estimating and identifying) the data based on the trained neural network.

The learner generates or updates the neural network. The learner obtains learning data to generate the neural network. For example, the learner obtains the learning data from the storage 16 or the server storage or from the outside. The learning data may be data used for training the neural network, and the data subjected to the foregoing operations may be used as the learning data to train the neural network.

Before making the neural network learn based on the learning data, the learner performs a preprocessing operation with regard to the obtained learning data or selects data to be used in learning among a plurality of pieces of the learning data. For example, the learner processes the learning data to have a preset format, apply filtering to the learning data, or processes the learning data to be suitable for the learning by adding/removing noise to/from the learning data. The learner uses the preprocessed learning data for generating the neural network which is set to perform the operations.

The learned neural network includes a plurality of neural networks or layers. The nodes of the plurality of neural networks have weight values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer obtains target data to carry out the foregoing operations. The target data is obtained from the storage 16 or the server storage or from the outside. The target data may be data targeted to be recognized by the neural network. Before applying the target data to the learned neural network, the recognizer performs a preprocessing operation with respect to the obtained target data, or selects data to be used in recognition among a plurality of pieces of target data. For example, the recognizer processes the target data to have a preset format, apply filtering to the target data, or processes the target data into data suitable for recognition by adding/removing noise. The recognizer obtains an output value output from the neural network by applying the preprocessed target data to the neural network. Further, the recognizer obtains a stochastic value or a reliability value together with the output value.

Figure 4:
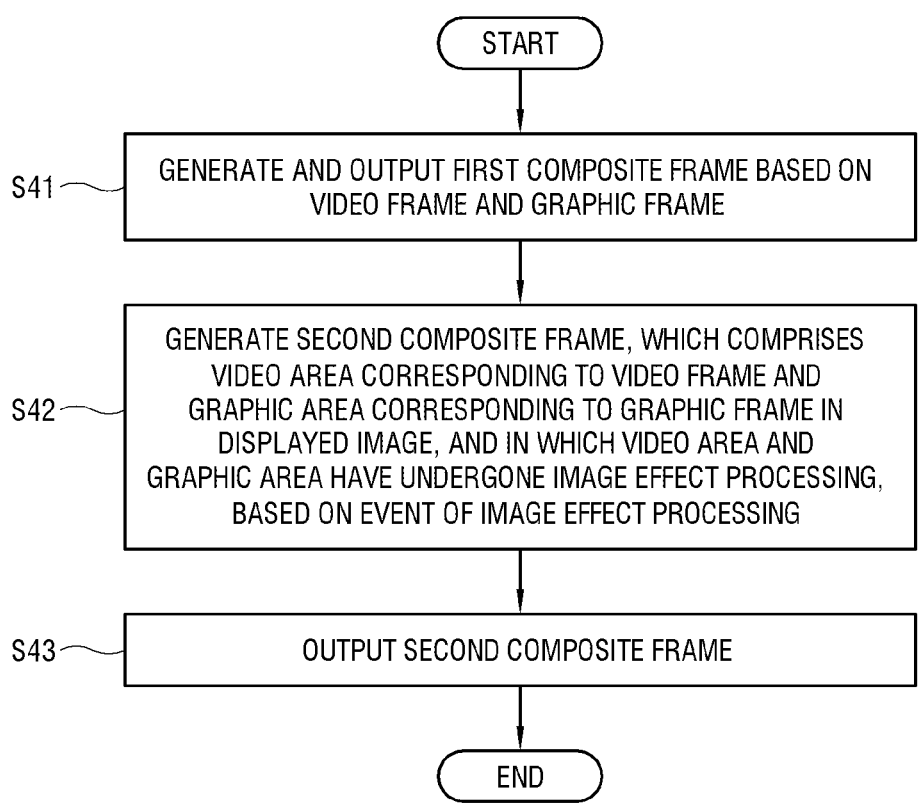
FIG. 4 illustrates an example of a method of controlling the electronic apparatus in FIG. 1.

FIG. 4 illustrates an example of a method of controlling the electronic apparatus in FIG. 1.

Operations to be described below with reference to FIG. 4 may be performed by the processor 5 of the electronic apparatus 10.

The processor 5 generates and outputs the first composite frame 3 based on the video frame 1 and the graphic frame 2 (S41).

The processor 5 generates the second composite frame 4, which includes the video area 6 corresponding to the video frame 1 and the graphic area 7 corresponding to the graphic frame 2 in the displayed image, and, in which the video area 6 and the graphic area 7 have undergone the image effect processing, in response to the event of the image effect processing (S42).

The processor 5 controls the second composite frame 4 to be output (S43).

In this way, the processor 5 may generate and output the second composite frame 4 based on the video frame 1 and the graphic frame 2, which have equally undergone the image effect processing, in response to the event of the image effect processing. Therefore, the apparatus configured to apply the image effect processing to the graphic frame 2 before combining with the video frame 1 not only gives visual stability to a user but also provides an image improved in quality.

Figure 5:
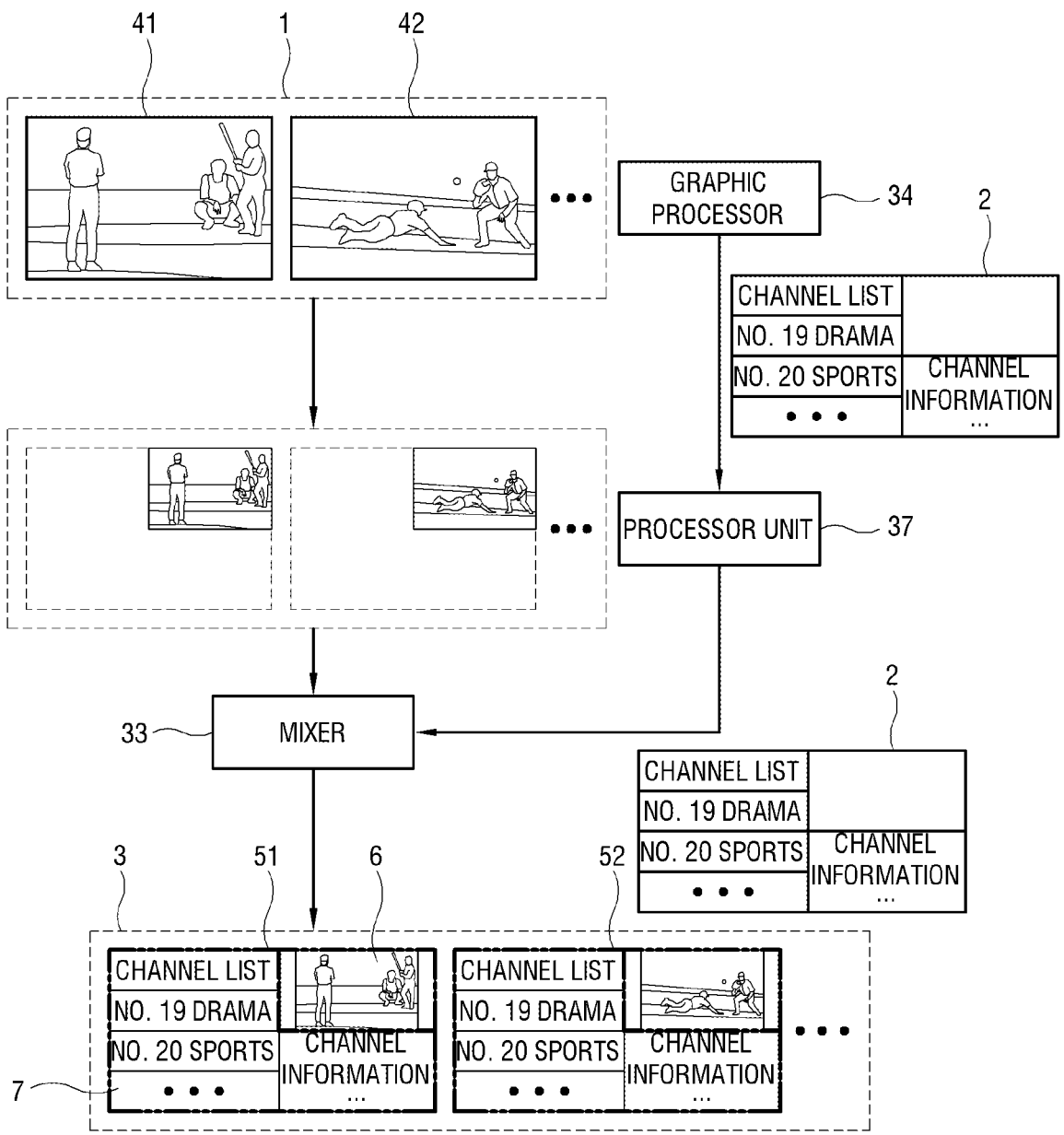
FIG. 5 illustrates an example of generating a first composite frame in connection with the operation S41 in FIG. 4.

FIG. 5 illustrates an example of generating a first composite frame in connection with the operation S41 in FIG. 4.

Below, the process of generating the first composite frame 3 based on the video frame 1 and the graphic frame 2 in response to no event of the image effect processing, e.g., the inactivation of the processing unit 37 will be described.

As shown in FIG. 5, in response to the inactivation of the processing unit 37, the graphic frame 2 is output from the graphic processor 34 and transmitted to the mixer 33 without undergoing the image effect processing of the processing unit 37.

The processor 5 may control adjustment to be performed in size, position, etc. with respect to the first video frame 41 among the plurality of video frames 1. The adjustment to be performed in size, position, etc. with respect to the first video frame 41 may be performed by the scaler 32 under control of the processor 5. For example, on the assumption that the graphic frame 2 corresponds to the EPG for selecting a broadcast program channel number and the video frame 1 corresponds to the broadcast program of the channel selected through the EPG, the size of the first video frame 41 may be adjusted to correspond to the size of the video area 6 included in a first composite frame 'a' 51 and displaying the broadcast program, or the position of the first video frame 41 may be adjusted according to the position of the video area 6.

The processor 5 may control the first composite frame 'a' 51 to be generated by combining the first video frame 41 adjusted in size, position, etc. with the graphic frame 2. The generation of the first composite frame 'a' 51 may be performed by the mixer 33 under control of the processor 5. The generated first composite frame 'a' 51 includes the video area 6 corresponding to the first video frame 41, and the graphic area 7 corresponding to the graphic frame 2. For example, the video area 6 of the first composite frame 'a' 51 may display the broadcast program, and the graphic area 7 may display the EPG.

The next video frame to the first video frame 41 among the plurality of video frames 1, e.g., a second video frame 42 may also be adjusted in size, position, etc. like the first video frame 41 and then combined to the graphic frame 2. As the second video frame 42 is combined to the graphic frame 2, a first composite frame 'b' 52 may be generated.

By the foregoing processes, the first composite frame 'a' 51, the first composite frame 'b' 52, etc. are generated based on the first video frame 41, the second video frame 42, etc. The graphic frame 2, which has not undergone the image effect processing, is displayed in the graphic area 7 included in the first composite frame 'a' 51, the first composite frame 'b' 52, etc. Even the video frame 1 has not undergone the image effect processing, and therefore the video frame 1, which has not undergone the image effect processing, is displayed in the video area 6 included in the first composite frame 'a' 51 and the first composite frame 'b' 52.

In this way, the processor 5 may generate the first composite frame 3, in which the video area 6 corresponding to the video frame 1 and the graphic area 7 corresponding to the graphic frame 2 have not undergone the image effect processing, in response to the inactivation of the processing unit 37.

Figure 6:
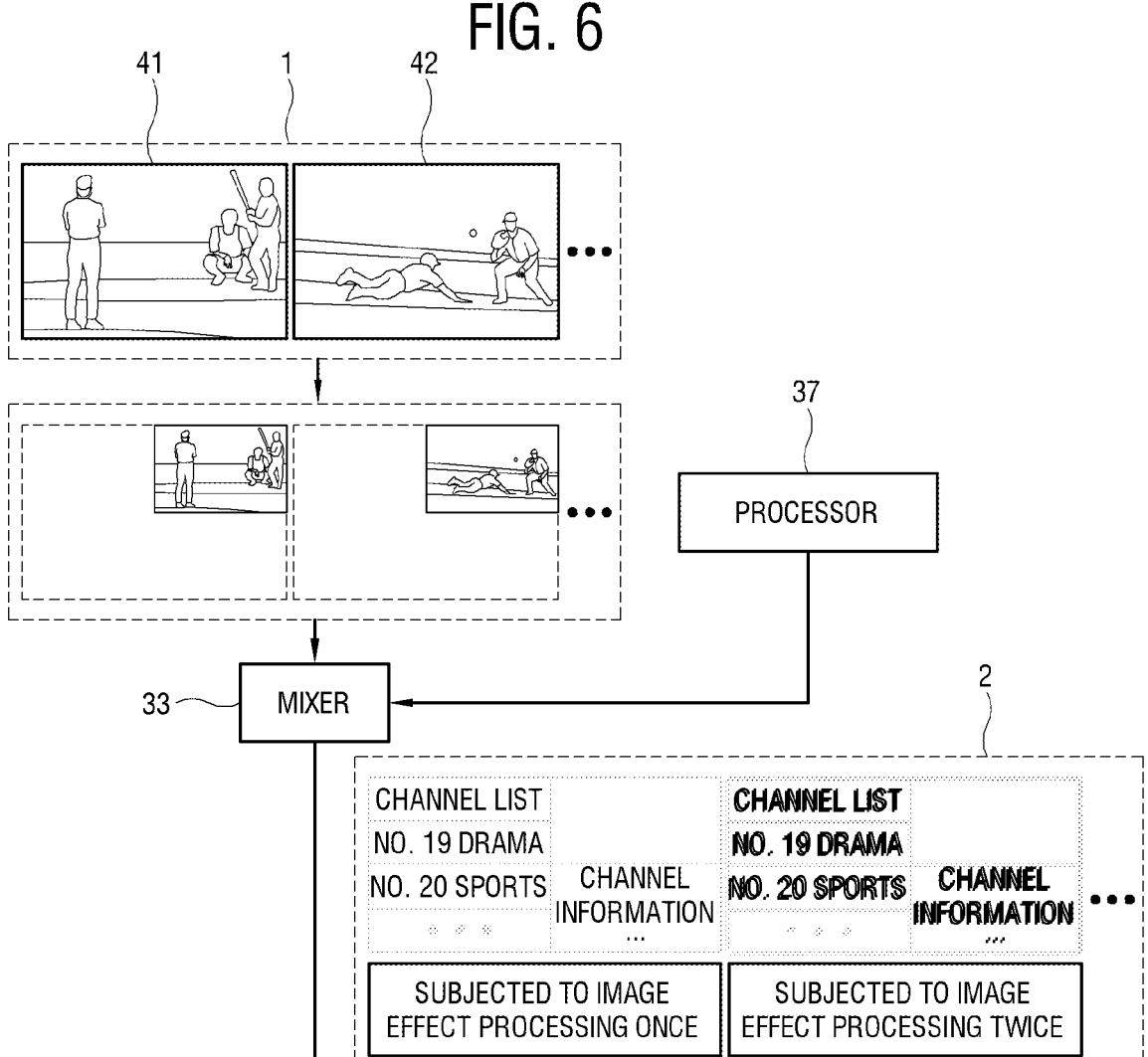
FIG. 6 illustrates an example of generating a first composite frame according to the related art, in connection with the operation S42 in FIG. 4.
Figure 6:
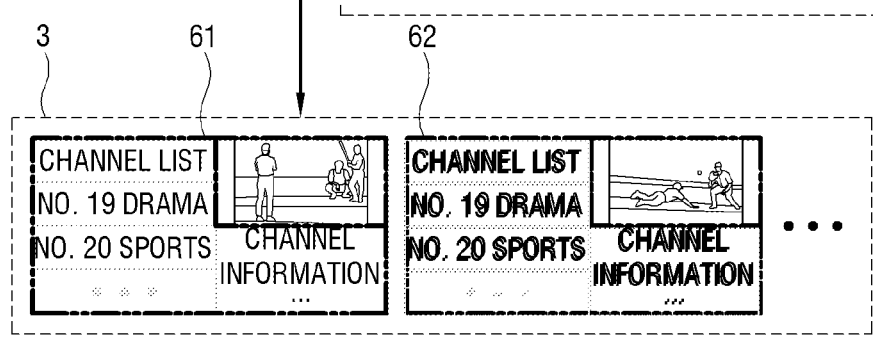
Figure 7:
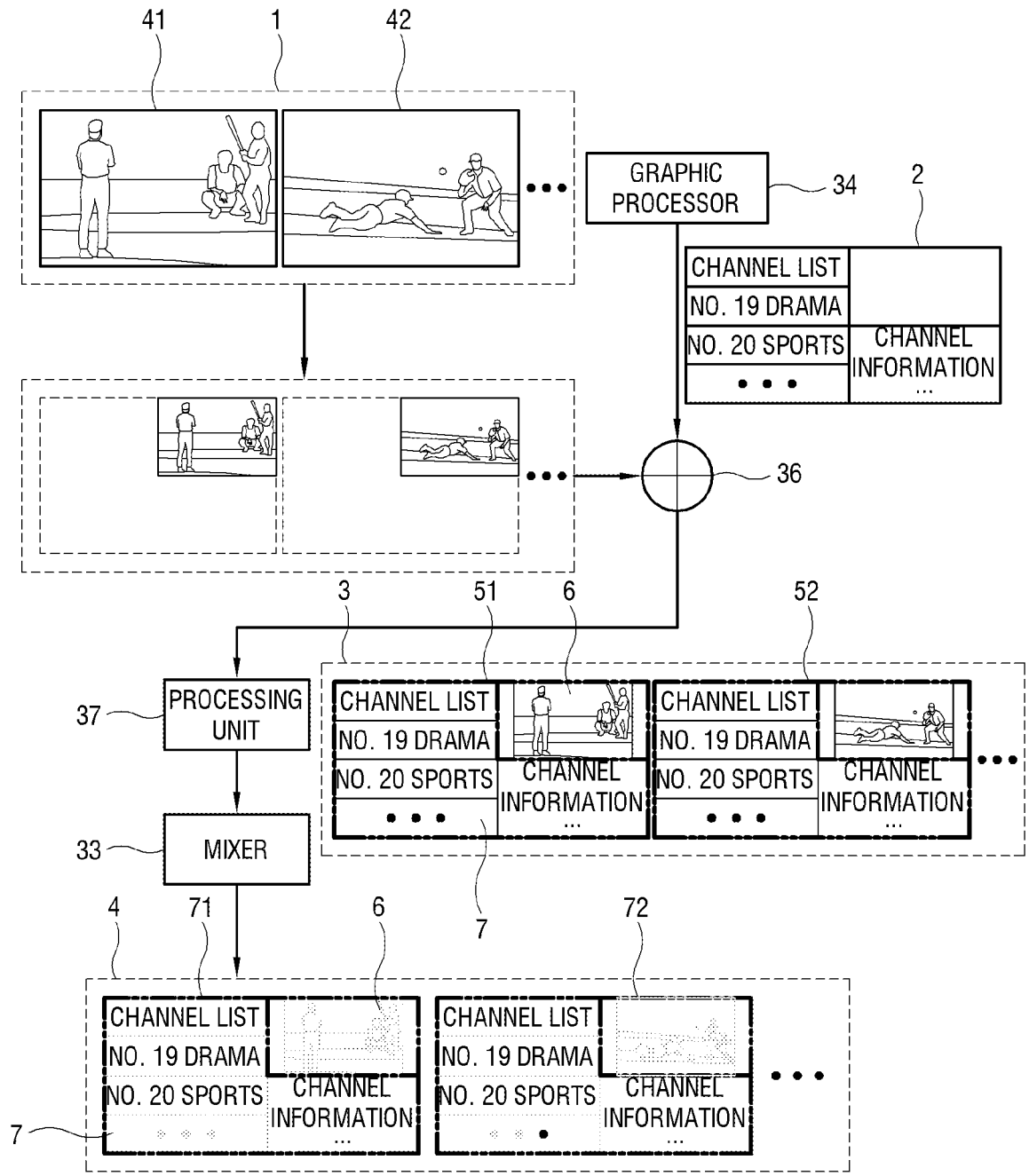
FIG. 7 illustrates an example of generating a second composite frame, in connection with the operation S42 in FIG. 4.

While the process of generating the first composite frame 3 including the video frame 1 and the graphic frame 2, to which the image effect processing is not applied, based on the inactivation of the processing unit 37 has been described above with reference to FIG. 5, the process of generating the first composite frame 3 including the video frame 1 and the graphic frame 2, to which the image effect processing is selectively applied, based on the activation of the processing unit 37 will be described in detail with reference to FIGS. 6 and 7.

FIG. 6 illustrates an example of generating a first composite frame according to the related art, in connection with the operation S42 in FIG. 4.

The related art to be described with reference to FIG. 6 may also include elements corresponding to the scaler 32, the mixer 33, the processing unit 37, etc. as described with reference to FIG. 3. In the following, for the convenience of description, the elements of the related art corresponding to those of the disclosure will be called the scaler 32, the mixer 33, the processing unit 37, etc.

According to the related art, when there is an event of requiring the image effect processing, the processing unit 37 is activated. As the processing unit 37 becomes activated, the image effect processing is performed with respect to the graphic frame 2.

The processing unit 37 may perform image effect processing with respect to the graphic frame 2, or may perform additional image processing with respect to the graphic frame 2 that has undergone the image effect processing. The processing unit 37 may include separate elements to perform the image effect processing or the additional image processing. For example, the processing unit 37 may include an effect applying unit and an effect processing unit.

The mixer 33, comprising mixing circuitry, combines the graphic frame 2, which has undergone the image effect processing, with the first video frame 41 among the plurality of video frames 1, thereby generating a first composite frame 'a' 61. The first video frame 41 may have been adjusted in size, position, etc. through the scaler 32 so as to combine with the graphic frame 2. The first composite frame 'a' 61 based on the first video frame 41 is generated based on the graphic frame 2, to which the image effect processing has been applied once, and the first video frame 41 to which the image effect processing has not been applied. In other words, the first composite frame 'a' 61 is generated based on the first video frame 41 and the graphic frame 2 to which the image effect processing has been differently applied.

To generate a first composite frame 'b' 62 based on the next video frame to the first video frame 41 among the plurality of video frames 1, e.g., the second video frame 42, the processing unit 37 performs the image effect processing again with respect to the graphic frame 2 to which the image effect processing has been applied once. The graphic frame 2, to which the image effect processing has been applied once more, may undergo additional image processing.

The mixer 33 combines the graphic frame 2, to which the image effect processing has been applied twice, with the second video frame 42, thereby generating the first composite frame 'b' 62. The second video frame 42 may has been adjusted in size, position, etc. through the scaler 32.

The first composite frame 'b' 62 based on the second video frame 42 includes the graphic frame 2, to which the image effect processing has been applied twice, and the second video frame 42, to which the image effect processing has not been applied. In other words, the first composite frame 'b' 62 is generated based on the second video frame 42 and the graphic frame 2 to which the image effect processing has been differently applied.

Because the image effect processing is repetitively performed with respect to the graphic frame 2 as the combination between the plurality of video frames 1 and the graphic frame 2 progresses, the first composite frame 3 is generated based on the graphic frame 2 repetitively subjected to the image effect processing and the video frame 1 subjected to no image effect processing.

In this way, in the apparatus configured to perform the image effect processing for the graphic frame 2 before combining with the video frame 1, the first composite frame 3 in which the video frame 1 and the graphic frame 2 are selectively subjected to the image effect processing in response to the activation of the processing unit 37 is generated according to the related art. However, the generated first composite frame 3 in which the video frame 1 and the graphic frame 2 have equally undergone the image effect processing is not generated.

Below, the process of equally performing the image effect processing with respect to the video frame 1 and the graphic frame 2 in response to the activation of the processing unit 37 will be described in detail.

FIG. 7 illustrates an example of generating a second composite frame, in connection with the operation S42 in FIG. 4.

As shown in FIG. 7, in response to the activation of the processing unit 37, the processor 5 may control the first composite frame 'a' 51 to be generated by combining the graphic frame 2 with the first video frame 41 among the plurality of video frames 1. The combination between the first video frame 41 and the graphic frame 2 may be performed by the combining unit 36 under control of the processor 5. The first video frame 41 may have been adjusted in size, position, etc.

The processor 5 performs the image effect processing once with respect to the first composite frame 'a' 51, thereby generating a second composite frame 'a' 71. The second composite frame 'a' 71 includes the video area 6 corresponding to the first video frame 41 subjected to the image effect processing once and the graphic area 7 corresponding to the graphic frame 2 subjected to the image effect processing once. In other words, the first video frame 41 and the graphic frame 2, which have equally undergone the image effect processing, are displayed in the video area 6 and the graphic area 7 included in the second composite frame 'a' 71 based on the first video frame 41. As necessary, the additional image processing may be performed with respect to the second composite frame 'a' 71.

The second composite frame 'a' 71 may be transmitted to the display 12. The bypassing function may be performed by the mixer 33 under control of the processor 5.

The processor 5 generates a second composite frame 'b' 72 based on the next video frame to the first video frame 41 among the plurality of video frames 1, e.g., the second video frame 42. To generate the second composite frame 'b' 72, the graphic frame 2 or the first composite frame 'a' 51 may be used.

In more detail, the processor 5 may generate the first composite frame 'b' 52 by combining the graphic frame 2 with the second video frame 42, or may generate the first composite frame 'b' 52 by combining the first composite frame 'a' 51 generated based on the first video frame 41 in advance with the second video frame 42. The graphic frame 2 or the first composite frame 'a' 51 may have not undergone the image effect processing. Further, the graphic frame 2 may have graphic content maintained without changing.

Below, the process of generating the second composite frame 'b' 72 based on the first composite frame 'b' 52 generated by combining the graphic frame 2 with the second video frame 42. As described above, the first composite frame 'b' 52 may be generated by combining the graphic frame, which has not undergone the image effect processing, with the second video frame 42.

The processor 5 performs the image effect processing once with respect to the first composite frame 'b' 52, thereby generating the second composite frame 'b' 72. The image effect processing may be performed by the processing unit 37 under control of the processor 5.

The second composite frame 'b' 72 includes the video area 6 corresponding to the second video frame 42 subjected to the image effect processing once, and the graphic area 7 corresponding to the graphic frame 2 subjected to the image effect processing once. In the video area 6 and the graphic area 7 included in the second composite frame 'b' 72, the second video frame 42 and the graphic frame 2 which have equally undergone the image effect processing are displayed.

The process of generating the second composite frame 'b' 72 based on the first composite frame 'b' 52 generated by combining the first composite frame 'a' 51 with the second video frame 42 is similar to the foregoing process of generating the second composite frame 'b' 72 based on the first composite frame 'b' 52 generated by combining the graphic frame 2 with the second video frame 42. In other words, the processor 5 performs the image effect processing once with respect to the first composite frame 'b' 52 generated by combining the first composite frame 'a' 51 with the second video frame 42, thereby generating the second composite frame 'b' 72. The image effect processing may be performed by the processing unit 37 under control of the processor 5.

The second composite frame 'b' 72 includes the video area 6 corresponding to the second video frame 42 subjected to the image effect processing once, and the graphic area 7 corresponding to the graphic frame 2 subjected to the image effect processing once. In the video area 6 and the graphic area 7 included in the second composite frame 'b' 72, the second video frame 42 and the graphic frame 2 which have equally undergone the image effect processing are displayed.

In this way, in the apparatus configured to apply the image effect processing to the graphic frame 2 before combining with the video frame 1, the processor 5 may generate and output the second composite frame 4 based on the video frame 1 and the graphic frame 2 which have equally undergone the image effect processing. Therefore, the second composite frame 4, which has equally undergone the image effect processing, not only gives visual stability to a user but also provides an image improved in quality.

Figure 8:
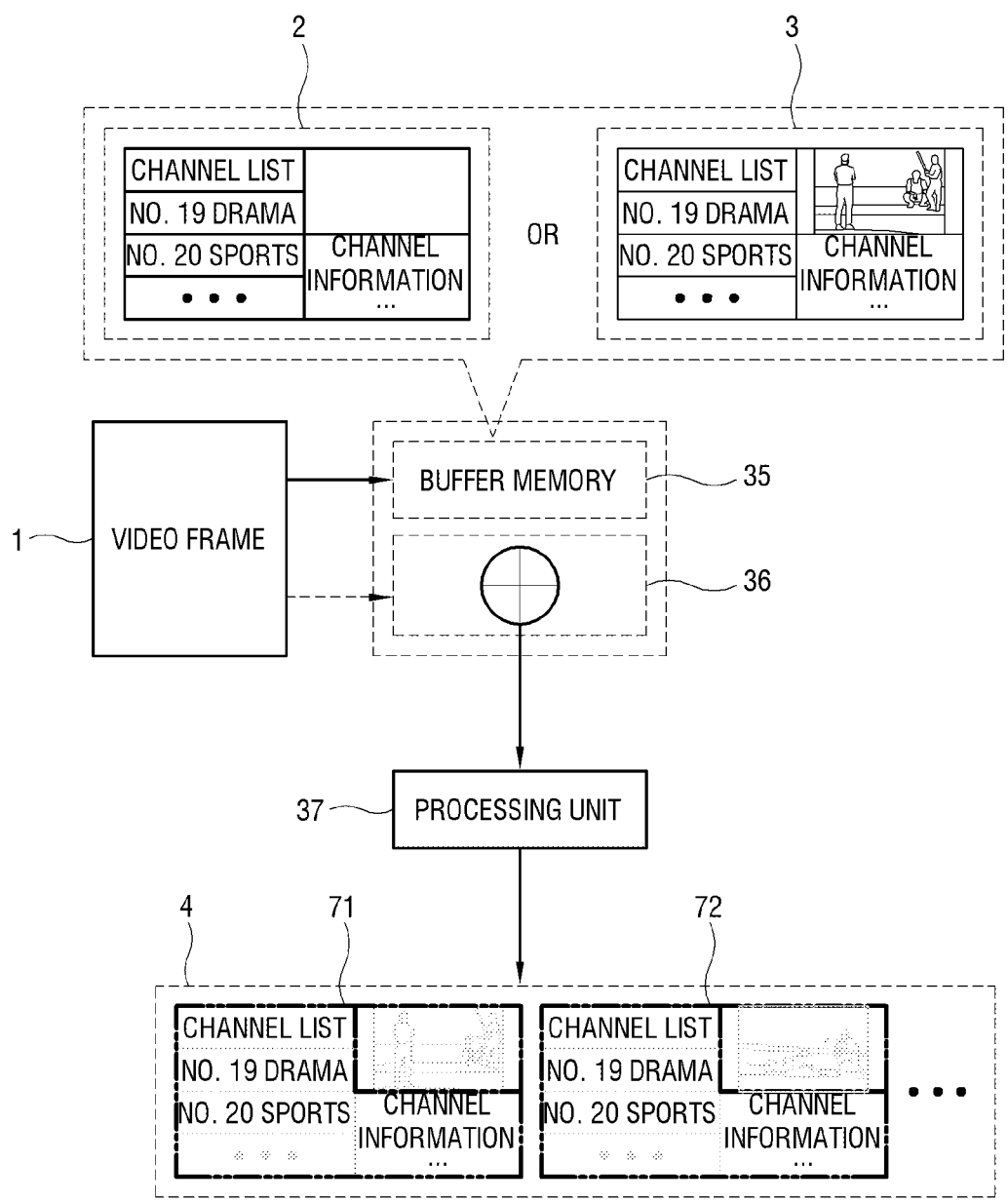
FIG. 8 illustrates an example of generating a second composite frame based on the graphic frame or the first composite frame, in connection with the operation S42 in FIG. 4.

FIG. 8 illustrates an example of generating a second composite frame based on the graphic frame or the first composite frame, in connection with the operation S42 in FIG. 4.

As shown in FIG. 8, the processor 5 may use the graphic frame 2 or the first composite frame 3, which has been stored in the buffer memory 35, to generate the second composite frame 4. The graphic frame 2 or the first composite frame 3 stored in the buffer memory 35 may have not undergone the image effect processing.

The graphic frame 2 may be output from the graphic processor 34 and stored in the buffer memory 35. The first composite frame 3 may be generated by combining the graphic frame 2, which has initially been output from the graphic processor 34, with the video frame 1. As described with reference to FIG. 7, the first composite frame 3 includes the first composite frame 'a' 51 generated by combining the graphic frame 2, which have initially been output from the graphic processor 34 with the first video frame 41 among the plurality of video frames 1.

The processor 5 may capture the generated first composite frame 3 and store the captured first composite frame 3 in the buffer memory 35. However, there are no limits to a method of acquiring and storing the graphic frame 2 or the first composite frame 3, and therefore the graphic frame 2 or the first composite frame 3, which has not undergone the image effect processing, may be acquired and stored in the buffer memory 35 by various methods.

The video frame 1 may be stored in the buffer memory 35 in response to the activation of the processing unit 37. The video frame 1 may be subjected to the scaling and then stored in the buffer memory 35, or may be stored in the buffer memory 35 and then subjected to the scaling under control of the processor 5. The buffer memory 35 may directly perform the scaling with respect to the video frame 1, or may include a separate element for the scaling.

Below, the process of using the graphic frame 2 stored in the buffer memory 35 to generate the second composite frame 4 will be described. The video frame 1 stored in the buffer memory 35 is combined to the graphic frame 2, thereby generating the first composite frame 3. The combination between the video frame 1 and the graphic frame 2 may be performed by the combining unit 36. In addition, the first composite frame 3 may be subjected to the image effect processing, thereby generating the second composite frame 4.

However, the video frame 1 may not be stored in the buffer memory 35. In this case, the first composite frame 3 may be generated by combining the graphic frame 2 with the video frame 1 output from the video processor 31.

The process of using the first composite frame 3 stored in the buffer memory 35 to generate the second composite frame 4 is similar to the process of using the graphic frame 2 stored in the buffer memory 35 to generate the second composite frame 4. In other words, the video frame 1 stored in the buffer memory 35 is combined to the first composite frame 3, thereby generating a new first composite frame 3. Further, the new first composite frame 3 is subjected to the image effect processing, thereby generating the second composite frame 4.

As above, the processor 5 may generate and output the second composite frame 'a' 71 based on the first video frame 41 among the plurality of video frames 1, the second composite frame 'b' 72 based on the next video frame to the first video frame 41, e.g., the second video frame 42, and so on. The second composite frame 'a' 71 includes the first video frame 41 and the graphic frame 2 which have equally undergone the image effect processing, and the second composite frame 'b' 72 includes the second video frame 42 and the graphic frame 2 which have equally undergone the image effect processing.

In this way, the processor 5 uses the graphic frame 2 or the first composite frame 3, which has been stored in the buffer memory 35, in generating the second composite frame 4, thereby more quickly generating and outputting the second composite frame 4.

Figure 9:
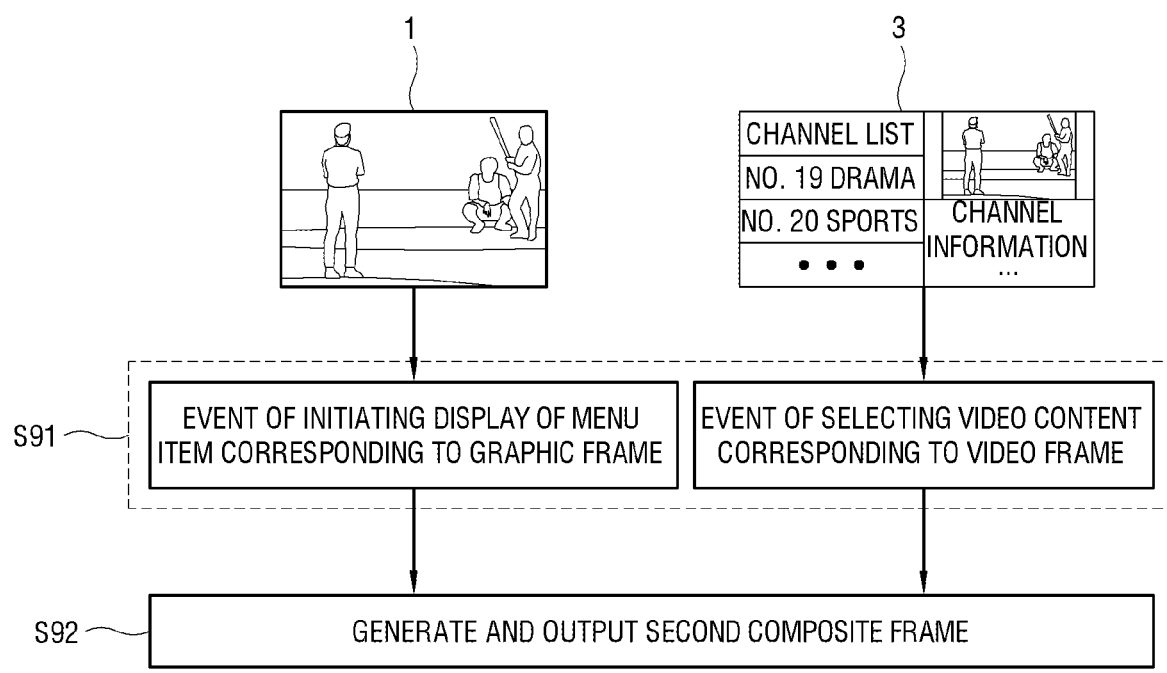
FIG. 9 illustrates an example of an event of requiring image effect processing, in connection with the operation S42 in FIG. 4.

FIG. 9 illustrates an example of an event of requiring image effect processing, in connection with the operation S42 in FIG. 4.

The processor 5 may control the second composite frame 4 to be output in response to an event where video content corresponding to the video frame 1 and a menu item corresponding to the graphic frame 2 are simultaneously displayed. In other words, the processor 5 may identify the event, in which the video content and the menu item are simultaneously displayed, as the event of requiring the image effect processing. Below, an example of the event where the video content and the menu item are simultaneously displayed will be described with reference to FIG. 9.

As a first example, a condition where the video content corresponding to the video frame 1 is displayed will be assumed. The processor 5 may identify whether there is an event of initiating display of a menu item corresponding to the graphic frame 2 while the video content is being displayed. When there is the event of initiating the display of the menu item corresponding to the graphic frame 2 (S91), the processor 5 may identify this event as the event where the video content and the menu item are simultaneously displayed. Therefore, the processor 5 may perform control to generate and output the second composite frame 4 (S92).

For example, as shown in FIG. 9, the processor 5 may identify whether the EPG for selecting a broadcast program channel number corresponding to the graphic frame 2 is executed while a certain broadcast program corresponding to the video frame 1 is being displayed. When the EPG is executed while the broadcast program is being displayed, the processor 5 identifies an event where the broadcast program and the EPG are simultaneously displayed, and performs control to generate and output the second composite frame 4 based on the broadcast program and the EPG.

As a second example, a condition where the first composite frame 3 is displayed will be assumed. The first composite frame 3 may be generated by combining the graphic frame 2 with the video frame 1. The processor 5 may identify whether there is a selection event for the video content while the video content corresponding to the video frame 1 is being displayed on the video area 6 included in the first composite frame 3. The video content selected by the selection event may be different from the video content displayed first. When there is the selection event for the video content (S91), the processor 5 may identify this event as the event where the video content and the menu item are simultaneously displayed. Therefore, the processor 5 may perform control to generate and output the second composite frame 4 (S92).

In this way, the processor 5 identifies the event of requiring the image effect processing for each condition, and thus generates and outputs the second composite frame 4 actively according to various conditions.

Figure 10:
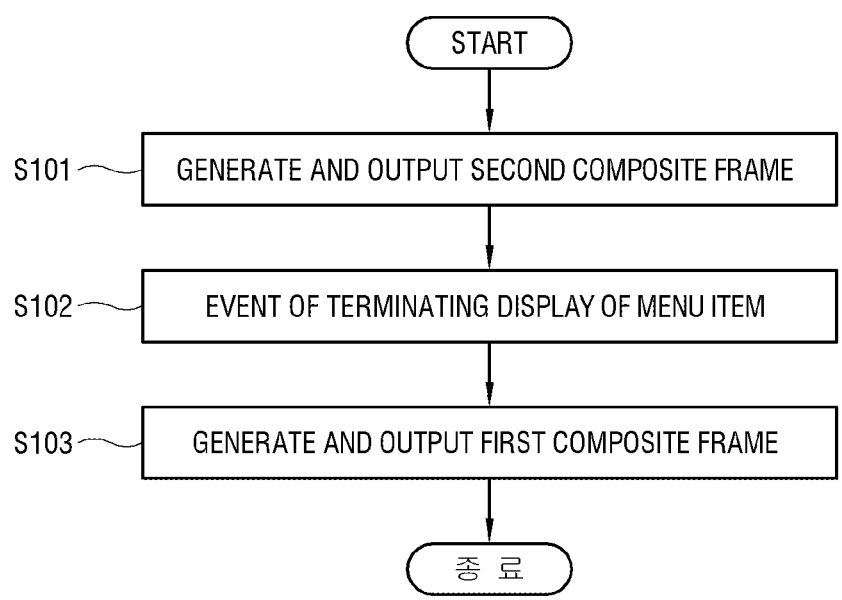
FIG. 10 illustrates an example of an event of requiring the termination of the image effect processing, in connection with the operation S42 in FIG. 4.

FIG. 10 illustrates an example of an event of requiring the termination of the image effect processing, in connection with the operation S42 in FIG. 4.

As described above with reference to FIG. 9, the processor 5 identifies the event of displaying the video content and the menu item simultaneously as the event of requiring the image effect processing, and generates and outputs the second composite frame 4 (S101).

The processor 5 may identify whether there is an event of terminating the display of the menu item. When there is the event of terminating the display of the menu item (S102), the processor 5 may identify this event as the event of requiring the termination of the image effect processing. Therefore, the processor 5 can terminate the generation and output of the second composite frame 4, and perform control to generate and output the first composite frame 3 (S92).

For example, when there is an event of terminating the display of any one of the broadcast program or the EPG while the second composite frame 4 is being output based on the broadcast program and the EPG, the processor 5 may identify this event as the event of requiring the termination of the image effect processing, and terminate the generation and output of the second composite frame 4.

In this way, the processor 5 identifies the event of requiring the termination of the image effect processing for each condition, thereby terminating the generation and output of the second composite frame 4 actively according to various conditions and performing control to generate and output the first composite frame 3.

Figure 11:
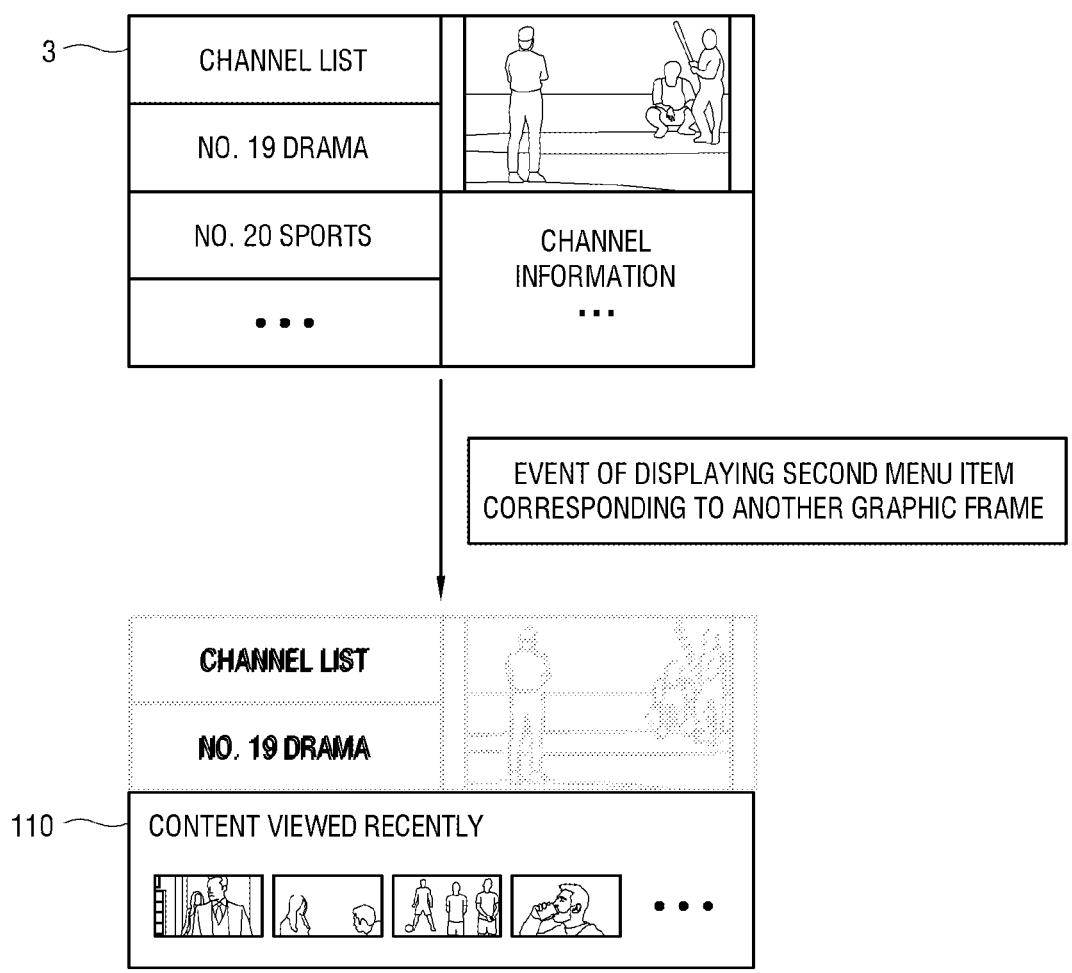
FIG. 11 illustrates another example of the event of requiring the image effect processing, in connection with the operation S42 in FIG. 4.

FIG. 11 illustrates another example of the event of requiring the image effect processing, in connection with the operation S42 in FIG. 4.

For the convenience of description, a condition where the first composite frame 3 is displayed based on the video frame 1 and a first graphic frame 2 will be assumed. In this condition, the processor 5 may identify whether a second menu item 110 corresponding to a second graphic frame different from the first graphic frame 2 is displayed on the graphic area 7 included in the first composite frame 3.

The second menu item 110 may be different in type from a first menu item corresponding to the first graphic frame 2. For example, when the first menu item corresponding to the first graphic frame 2 is the EPG for selecting the broadcast program channel number, the second menu item 110 may be an EPG showing history information about the broadcast program. However, without limitations, the second menu item 110 may include various EPG different in type from the first menu item.

When the second menu item 110 is displayed corresponding to the second graphic frame different from the first graphic frame 2, the processor 5 may identify this display of the second menu item 110 as the event of requiring the image effect processing. In this case, as described with reference to FIG. 9, the processor 5 may perform the image effect processing with respect to the first composite frame 3, which has been generated by combining the first graphic frame 2 with the video frame 1, thereby generating the second composite frame 4.

When the display of the second menu item 110 is terminated, the processor 5 may identify the terminated display of the second menu item 110 as the event of requiring the termination of the image effect processing, thereby terminating the generation and output of the second composite frame 4 as described with reference to FIG. 10.

In this way, the processor 5 may identify the event of requiring the image effect processing for each condition, thereby generating and outputting the second composite frame 4 actively according to conditions.

Figure 12:
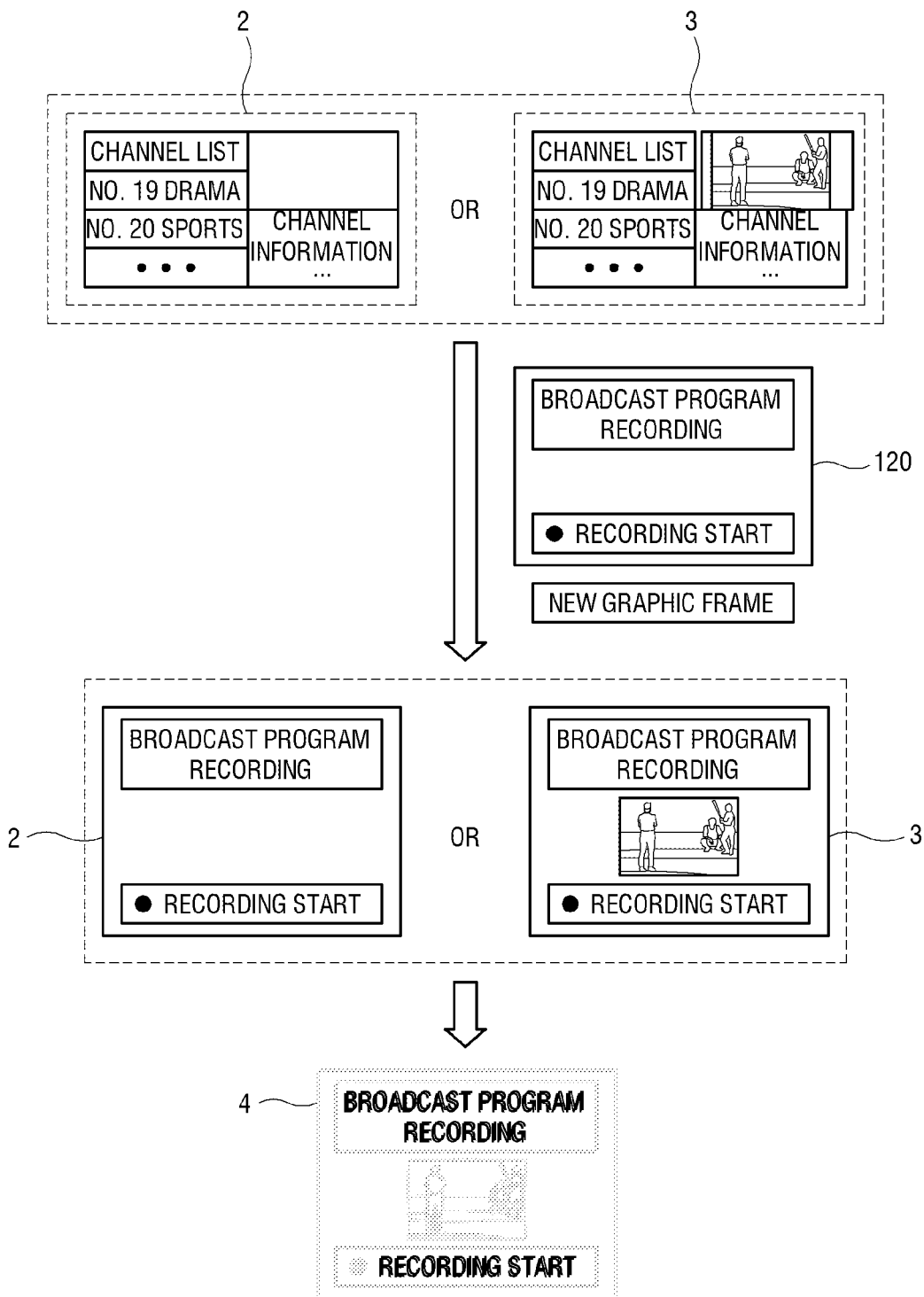
FIG. 12 illustrates an example of updating the graphic frame or the first composite frame in FIG. 8.

FIG. 12 illustrates an example of updating the graphic frame or the first composite frame in FIG. 8.

As described above with reference to FIG. 8, the graphic frame 2 or the first composite frame 3, which has been stored in the buffer memory 35, is used to generate the second composite frame 4. Below, the process of updating the graphic frame 2 or the first composite frame 3 stored in the buffer memory 35 will be described with reference to FIG. 12.

For the convenience of description, it will be assumed that the first menu item corresponding to the graphic frame 2 previously stored in the buffer memory 35 is an EPG for selecting a broadcast program channel number, and a second menu item 120 corresponding to a new graphic frame is an EPG for recording a broadcast program. In this case, the second composite frame 4 may be generated based on the broadcast program corresponding to the video frame 1, and the EPG for selecting the broadcast program channel number corresponding to the graphic frame 2.

When the EPG for selecting the broadcast program channel number corresponding to the graphic frame 2 is changed into the EPG for recording the broadcast program corresponding to the new graphic frame 120, the new graphic frame 120 corresponding to the EPG for recording the broadcast program is stored in the buffer memory 35. In other words, the previously stored graphic frame 2 is changed into the new graphic frame 120. The change into the EPG for recording the broadcast program may be performed in response to a user's input for changing the EPG.

In response to the change into the new graphic frame 120, the processor 5 may generate and output the first composite frame 3 or the second composite frame 4 based on the EPG for recording the broadcast program corresponding to the new graphic frame 120 with respect to the subsequent video frames 1.

For example, the first composite frame 3 is generated by combining the video frame 1 stored in the buffer memory 35 with the new graphic frame 120, and the generated first composite frame 3 is subjected to the image effect processing, thereby generating the second composite frame 4 based on the new graphic frame 120 that has undergone the image effect processing.

Meanwhile, the first composite frame 3 initially generated based on the new graphic frame 120 may be used to generate the second composite frame 4. In other words, the processor 5 stores the new first composite frame 3 in the buffer memory 35, and combines the subsequent video frame 1 with the new first composite frame 3, thereby generating and outputting the second composite frame 4. The second composite frame 4 generated and output as above includes the video frame 1 and the new graphic frame 120 which have equally undergone the image effect processing.

In this way, the graphic frame 2 or the first composite frame 3, which has been previously stored in the buffer memory 35, is updated based on the new graphic frame 120 to generate and output the second composite frame 4, thereby generating and outputting the second composite frame 4 adaptively according to conditions.

Each "processor" herein comprises processing circuitry. "Based on" as used herein covers based at least on.

Various example embodiments may be achieved by software including one or more commands stored in a storage medium readable by the electronic apparatus 1 and the like (machine). For example, the processor 5 of the electronic apparatus 1 may call and execute at least one command among one or more stored commands from the storage medium. This enables the electronic apparatus 1 and the like apparatus to operate and perform at least one function based on the at least one called command. The one or more commands includes a code produced by a compiler or a code executable by an interpreter. The machine-readable storage medium may be provided in the form of a non-transitory storage medium. Here, the 'non-transitory' merely means that the storage medium is a tangible device and does not include a signal (for example, an electromagnetic wave), and this term does not distinguish between cases of being semi-permanently and temporarily stored in the storage medium. For instance, the 'non-transitory storage medium' may include a buffer in which data is temporarily stored.

For example, the method according to various embodiments may be provided as involved in a computer program product. The computer program product may include instructions of software to be executed by the processor as mentioned above. The computer program product is traded as a commodity between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least a part of the computer program product (e.g., a downloadable app) may be transitorily stored or temporarily produced in a machine-readable storage medium such as a memory of a manufacturer server, an application-store server, or a relay server.

Although a few embodiments have been shown and described, it will be appreciated by those skilled in the art that changes may be made in these embodiments without departing from the principles, the scope of which is defined in the appended claims and their equivalents.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic apparatus comprising:
   a video processor configured to output a video frame;
   a graphic processor configured to output a graphic frame;
   a mixer comprising circuitry;
   a user input; and
   at least one processor, comprising processor circuitry, individually and/or collectively configured to:
      control the mixer to generate a first composite frame by adjusting a size and a position of a first video frame and combining the first video frame of which the size and the position are adjusted and the graphic frame, based on a user's input for an image effect processing being received through the user input,
      generate a first image-effect-processed composite frame by performing the image effect processing on the first composite frame,
      control the mixer to generate a second composite frame by adjusting a size and a position of a second video frame and combining the second video frame of which the size and the position are adjusted and the graphic frame, and
      generate a second image-effect-processed composite frame by performing the image effect processing on the second composite frame and output the second image-effect-processed composite frame.

2. The electronic apparatus of claim 1, wherein the at least one processor is configured to store at least one of the graphic frame or the first composite frame in a buffer memory, combine the stored graphic frame and/or first composite frame with a subsequent video frame, and perform the image effect processing to generate the second composite frame.

3. The electronic apparatus of claim 2, wherein the at least one processor is configured to control the stored graphic frame and/or first composite frame to be updated with a new graphic frame based on an event of updating the graphic frame.

4. The electronic apparatus of claim 1, wherein the at least one processor is configured to control the second composite frame to be output based on an event of simultaneously displaying video content corresponding to the video frame and a menu item corresponding to the graphic frame.

5. The electronic apparatus of claim 4, wherein the at least one processor is configured to control the first composite frame to be output based on an event of terminating the display of the menu item.

6. The electronic apparatus of claim 4, wherein the at least one processor is configured to control the second composite frame to be output based on an event of displaying a second menu item corresponding to a graphic frame different from the graphic frame on the video area and the graphic area in which the video content and the menu item are simultaneously displayed respectively.

7. The electronic apparatus of claim 1, wherein the imaging effect processing includes at least one of blurring, sharpening, and filtering.

8. A method of controlling an electronic apparatus, the method comprising:
   generating a first composite frame by adjusting a size and a position of a first video frame and combining the first video frame of which the size and the position are adjusted and a graphic frame;

based on receipt of input for an image effect processing being received through a user input:

generating a first image-effect-processed composite frame by performing the image effect processing on the first composite frame;

generating a second composite frame by adjusting a size and a position of a second video frame and combining the second video frame of which the size and the position are adjusted and the graphic frame; and generating a second image-effect-processed composite frame by performing the image effect processing on the second composite frame; and outputting the second image-effect-processed composite frame.

9. The method of claim 8, wherein the generating and outputting the first composite frame comprises storing at least one of the graphic frame or the first composite frame, and the generating the second composite frame comprises combining the stored graphic frame and/or first composite frame, with a subsequent video frame, and performing the image effect processing to generate the second composite frame.

10. The method of claim 8, further comprising updating the stored graphic frame and/or first composite frame with a new graphic frame based on an event of updating the graphic frame.

11. The method of claim 8, wherein the outputting the second composite frame comprises outputting the second composite frame based on an event of simultaneously displaying video content corresponding to the video frame and a menu item corresponding to the graphic frame.

12. The method of claim 11, further comprising outputting the first composite frame based on an event of terminating the display of the menu item.

13. The method of claim 11, further comprising outputting the second composite frame based on an event of displaying a second menu item corresponding to a graphic frame different from the graphic frame on the video area and the graphic area in which the video content and the menu item are simultaneously displayed respectively.

14. The method of claim 8, wherein the imaging effect processing includes at least one of blurring, sharpening, and filtering.

15. A non-transitory recording medium storing a computer program comprising a code to perform a method of controlling an electronic apparatus as a computer-readable code, the method comprising:

generating a first composite frame by adjusting a size and a position of a first video frame and combining the first video frame of which the size and the position are adjusted and a graphic frame;

based on a user's input for an image effect processing being received through the user input:

generating a first image-effect-processed composite frame by performing the image effect processing on the first composite frame;

generating a second composite frame by adjusting a size and a position of a second video frame and combining the second video frame of which the size and the position are adjusted and the graphic frame;

generating a second image-effect-processed composite frame by performing the image effect processing on the second composite frame;

outputting the second image-effect-processed composite frame.

16. The non-transitory recording medium storing a computer program of claim 15, wherein the imaging effect processing includes at least one of blurring, sharpening, and filtering.

\* \* \* \* \*